Nov. 5, 1957  L. G. DURHAM  2,812,494
PULSE HEIGHT MEASUREMENT SYSTEM
Filed May 6, 1954  2 Sheets-Sheet 1

INVENTOR.
LELAND G. DURHAM,
BY
Henry Hyman
ATTORNEY.

Nov. 5, 1957 L. G. DURHAM 2,812,494
PULSE HEIGHT MEASUREMENT SYSTEM
Filed May 6, 1954 2 Sheets-Sheet 2
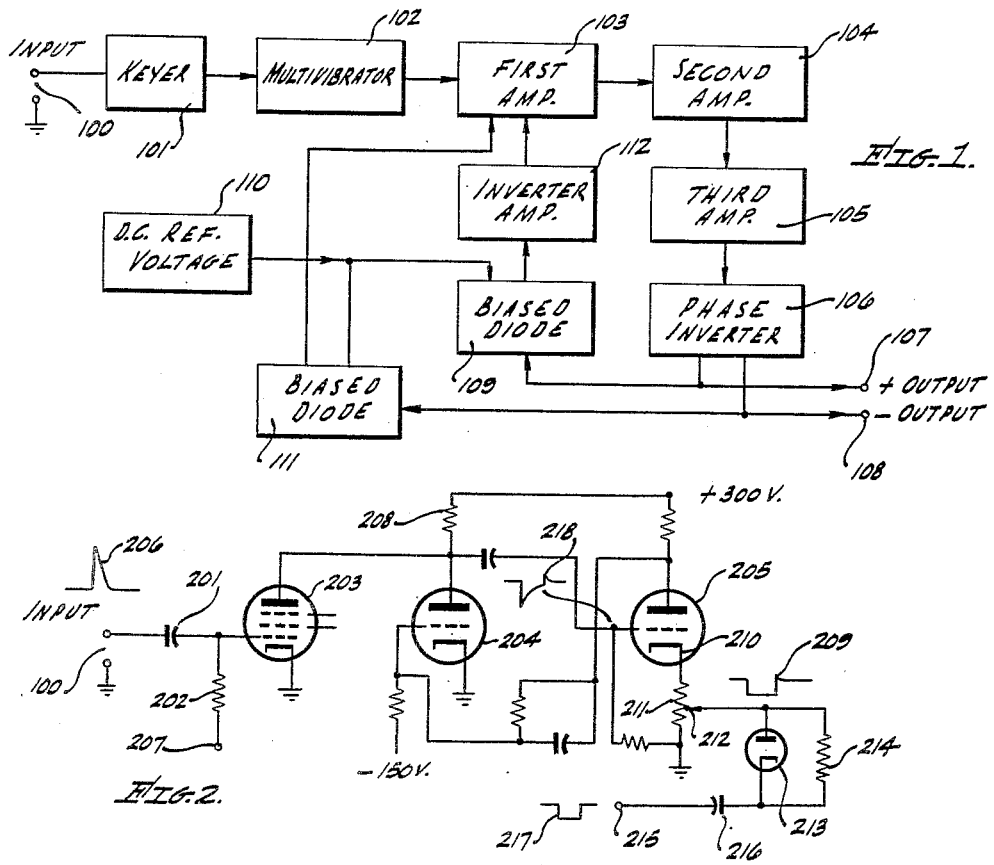
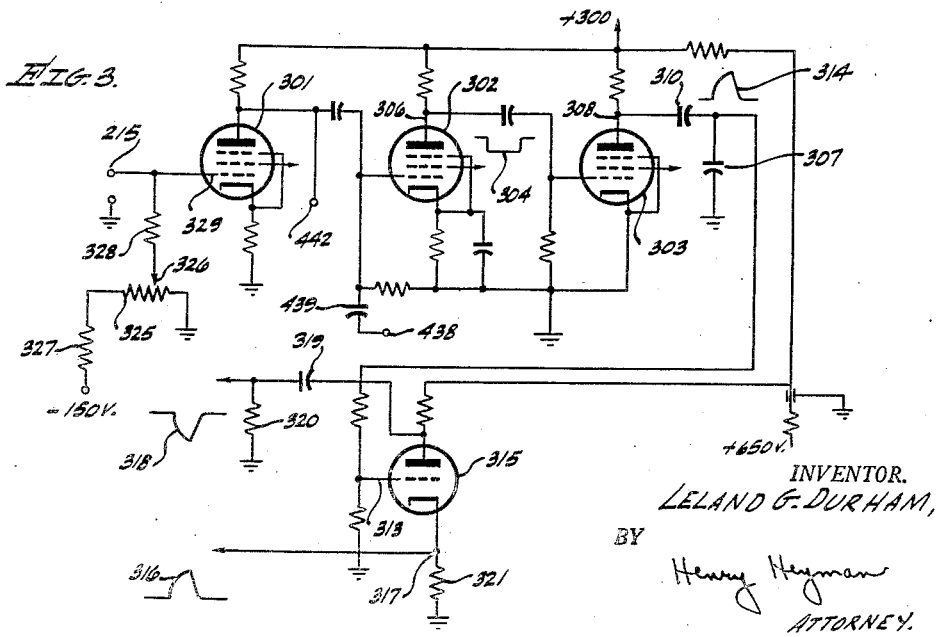
INVENTOR.
LELAND G. DURHAM,
BY
Henry Heyman
ATTORNEY.

United States Patent Office 2,812,494
Patented Nov. 5, 1957

2,812,494

PULSE HEIGHT MEASUREMENT SYSTEM

Leland Gerald Durham, Pacific Palisades, Calif., assignor to Hughes Aircraft Company, Culver City, Calif., a corporation of Delaware Application May 6, 1954, Serial No. 428,027

4 Claims. (Cl. 324—121)

This invention relates to pulse height measurement systems and in particular to a means for accurately measuring the height of any selected portion of a complex pulse waveform by comparison of the said portion with a pulse of known and adjustable amplitude and width, both of which are independent of the pulse repetition frequency.

The measurement of pulse height normally requires complex equipment where it is sought to examine the amplitude of a selected portion of a high speed pulse of complex waveform.

The present invention comprises a circuit system and a simple technique of utilizing the system for measurement of selected portions of complex high speed pulse waveforms. A pulse is generated in synchronism with the pulse to be measured. The pulse generated by the circuit may be controlled as to pulse width and amplitude irrespective of pulse repetition rate. The pulse to be measured is compared with the pulse generated by the circuits of this invention and displayed on an oscillograph. The amplitude adjustment of the locally generated pulse is controlled by an adjustable D. C. reference voltage source. When the pulse being measured is equal and opposite to the locally generated pulse as viewed on an oscillograph screen, the value of the corresponding D. C. reference voltage, as indicated on a D. C. voltmeter in the equipment of this invention, represents the voltage or height of the pulse waveform being investigated. The system of this invention provides for the selective measurement of the height of either positive-going or negative-going pulses.

Accordingly, it is an object of this invention to provide a direct reading pulse height indicating system.

It is a further object of this invention to provide a pulse height indicating system with which height of selected portions of a complex pulse waveform may be accurately measured.

It is still another object of this invention to provide pulse height measuring means whereby the height of either positive-going or negative-going pulse waveforms may be measured.

And it is yet another object of this invention to provide an accurate pulse height measurement system where the height of a pulse under test is related to an equivalent D. C. voltage.

A still further object of this invention is to provide a pulse height measurement system in which pulses of known amplitude and width are generated irrespective of pulse repetition rate, and means are provided with which to compare the known pulse with the pulse to be measured.

The novel features of this invention will become clear from the foregoing discussion, the detailed description of the figures which follows, and the appended claims. The organization of the invention and its operation, along with further objects and advantages of its use, will be understood by referring to the following description in connection with the accompanying drawings, in which:

Fig. 1 is a block diagram of the essential circuit groups of this invention, and their interconnection;

Fig. 2 is a detailed circuit diagram of a portion of the system involving the keyer and multivibrator circuits;

Fig. 3 is a detailed circuit diagram of a 3 stage video amplifier and inverter employed in the system of this invention;

Figure 4:
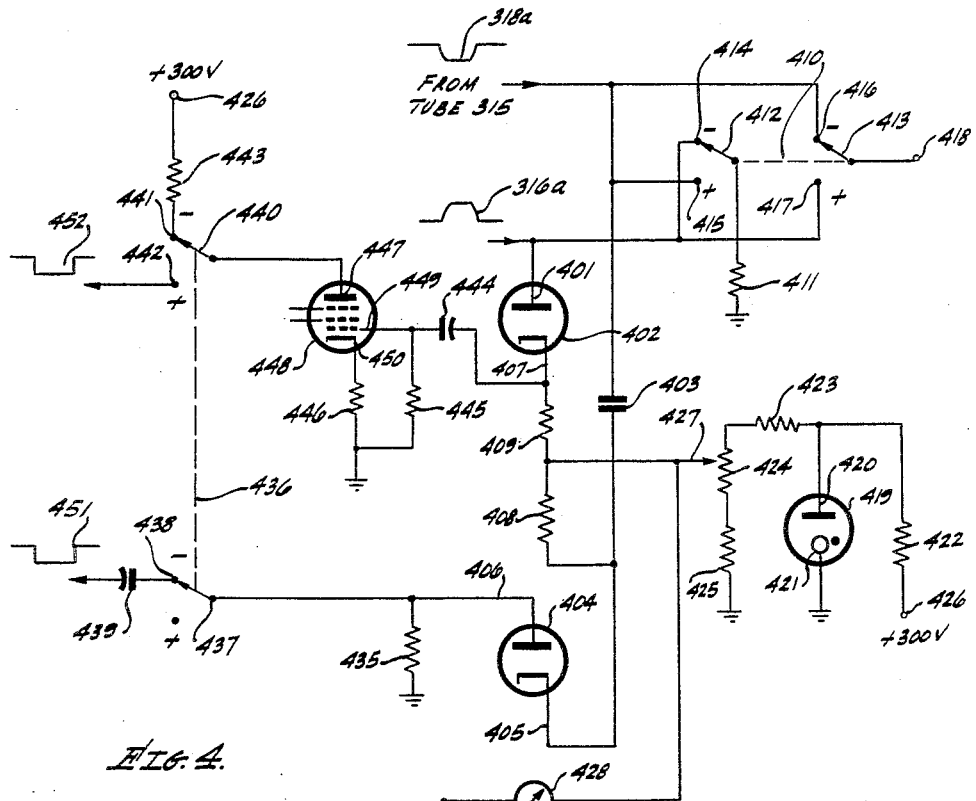
Fig. 4 is a simplified schematic circuit of the essential parts of the negative feedback network whereby the incoming pulse to be measured is cancelled.
Figure 6:
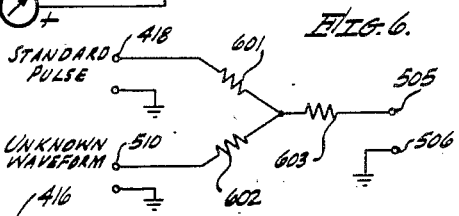
Fig. 6 is an alternative mixing circuit for the application of the pulse to be measured and the locally generated pulse to the vertical plate circuit of an oscillograph.

As has been briefly stated in the foregoing introduction, it is the major purpose of the present invention to provide a means for pulse height measurement and a direct reading indication of the measurement. The circuit system for accomplishing this purpose is shown in its most general arrangement in Fig. 1, and with greater particularity in Figs. 2–6. The operation of the system and circuits will be explained following the discussion of Figs. 1–6.

Referring now to Fig. 1 wherein a block diagram of the pulse height measuring system of this invention is shown, input terminals 100 are provided for synchronization connection to a source of pulses to be measured. The input terminals 100 are connected to the input circuit of a keyer tube 101. The keyer tube 101 is coupled to a multivibrator 102. Multivibrator 102 is coupled to a first video amplifier 103 which in turn is coupled to a second video amplifier 104. Video amplifiers 103 and 104 comprise a two stage video amplifier having a band width characteristic of approximately 15 megacycles. Video amplifier 104 is coupled to a third video amplifier 105. Video amplifier 105 has a band width characteristic of about 0.3 megacycle. A phase inverter 106 is coupled to the output of video amplifier 105. Phase inverter 106 has two output terminals, 107 for positive pulses with respect to ground and 108 for negative pulses with respect to ground. The positive output circuit of phase inverter 106 is coupled to a biased diode 109 in addition to output connection 107. The negative output circuit of phase inverter 106 is coupled to a biased diode 111 in addition to output connection 108. Both biased diodes 109 and 111 are coupled to a source of D. C. reference voltage 110. The source of D. C. reference voltage 110 is adjustable for biasing the diodes 109 and 111. Diode 111 has an output connection to first video amplifier 103. Diode 109 is connected to phase inverting video amplifier 112. Amplifier 112 is interposed so as to provide identical feedback voltage polarity to amplifier 103 from both diodes 111 and 109, the output signals of which are of opposite polarity. Circuit details of some of the components of the block diagram of Fig. 1 are shown in Fig. 2.

A tube 203 is connected as a keyer. This corresponds to the block 101 of Fig. 1. The keyer tube 203 is normally biased to a low value of plate current by a bias voltage applied at 207 through grid leak resistor 202. Thus when a positive-going input pulse such as 206 is applied to the grid of tube 203 through coupling capacitor 201 there will be a rise in plate current and consequent drop in plate voltage at the plate of tube 203.

A pair of tubes 204 and 205 are connected as a "oneshot" multivibrator. This multivibrator corresponds to block 102 in Fig. 1. Plate load resistor 208 in the plate circuit of tube 204 is also the plate load for tube 203 since the plates of both tubes 204 and 203 are connected together. Thus there will be a drop in plate voltage for tube 204 at the same time as the plate voltage of tube 203 drops. This initiates one cycle of operation of the multivibrator to result in pulse 218 at the grid of tube 204 and developing at the cathode 210 of tube 205 a negative pulse 209 having a predetermined duration which, in one embodiment, has been about two microseconds' duration. Connected between cathode 210 and ground is a potentiometer 211. The variable arm 212 of potentiometer 211 is connected to a rectifier 213 and a resistor 214 connected in parallel. The other terminal of the parallel connected resistor 214 and rectifier 213 is connected to an output terminal 215 through a coupling capacitor 216. The rectifier 213 is poled to eliminate any positive overshoot of pulse 209. The output pulse 217 of the system is, accordingly, a negative rectangular pulse as shown in the diagram.

Additional circuit details of the system of this invention are shown in Fig. 3 to which reference is now made. Fig. 3 shows the three stage video amplifier and phase inverter, part of the block diagram of Fig. 1 shown by blocks 103, 104, 105, and 106. The schematic elements of Fig. 3 have been simplified to illustrate the major input and output connection of each stage. The remaining parts of the circuits, not shown, are familiar to those skilled in the art. Tubes 301 and 302 comprise a two stage video amplifier of a construction that provides a 15 megacycle band width. At the plate circuit 306 of tube 302 there is developed the pulse waveform 304.

The amplitude of signals applied to amplifier 301 is under the control of a bias potentiometer 325 connected between a ground connection and a resistor 327. The other end of resistor 327 is connected to a source of negative bias potential. The amount of the negative bias which may be applied to the grid 329 of amplifier 301 through a grid leak resistor 328 is controlled by the adjustment of arm 326. Resistor 328 is connected between the grid 329 and arm 326. The arm 326 may be on a common shaft with arm 427 of resistor 424 shown in Fig. 4, to be described below.

Video amplifier stage 302 is coupled to a video amplifier stage 303. The video amplifier 303 has a band width limited to but 0.3 megacycle. A capacitor 310 connected to the plate 308 of amplifier 303 acts as a coupling capacitor with its other end connected to the grid of an inverter tube 313. A capacitor 307 connected from the output side of capacitor 310 to ground is effective in reducing the high frequency response and, consequently, limiting the band width of amplifier 303. A pulse 314 is developed at the input circuit (grid 313) of inverter tube 315. Inverter tube 315 produces two output signals. These are a positive pulse 316 at the cathode 317 of tube 315 and negative pulse 318 in the plate circuit of tube 315.

A capacitor 319 acts as an output coupling capacitor. A resistor 320 is connected as an output load for the output circuit. A resistor 321 is both a cathode bias and output load resistance for the positive pulse output circuit.

Fig. 4 illustrates one of the important features of the circuits of this invention. This feature is the means by which a feedback voltage is developed from one or the other of the pulses 318 and 316. The cathode circuit 317 (Fig. 3) is coupled to the anode 401 of a rectifier 402. The anode circuit of tube 315 is coupled through a capacitor 403 to the cathode 405 of a rectifier 404. Between the cathode 405 of rectifier 404 and the cathode 407 of rectifier 402 there are connected in series two resistors 408 and 409. A double-pole-double-throw switch 410 is connected between the positive pulse and negative pulse input circuits to anode 401 and capacitor 403, respectively. Switch 410 has an arm 412 and an arm 413 operated from a common shaft. Arm 412 may be switched from a negative terminal 414 to a positive terminal 415. Arm 413 may be switched from a negative terminal 416 to a positive terminal 417. An output load resistor 411 is connected between the terminal of arm 412 and ground. An output terminal 418 is connected to the terminal end of arm 413. In the negative position of the switch 410 load resistor 411 terminates the output circuit for the positive pulse which in this position is unused. In the positive position of switch 410 the load resistor 411 terminates the negative output circuit which in this position is unused.

A regulated D. C. voltage supply is provided through the use of a regulator tube 419. The anode 420 of regulator tube 419 is connected through a dropping resistor 422 to a source of D. C. potential applied at terminal 426. A resistor 423, a potentiometer 424 and a resistor 425 are connected in series between anode 420 and ground. Arm 427 of potentiometer 424 is connected to the junction of resistors 408 and 409. Arm 427 is also connected to the positive terminal of a voltmeter 428. The negative terminal of voltmeter 428 is connected to ground.

As has been previously described arm 326 of resistor 325 may be coupled to a common shaft with arm 427 of resistor 424. The positioning of the two controls 424 and 325 is so arranged that the signal applied to amplifier 302 will always be such as to provide one which just exceeds the negative bias pulse 451 or 452 derived from the feedback circuit as described below. The bias pulses 451 or 452 are developed as further described below.

The anode 406 of rectifier 404 is connected to a resistor 435 and an arm 437 of a double-pole-double-throw switch 436. In the negative position of switch 436 a contact terminal 438 is connected to a capacitor 439. Capacitor 439 is coupled to the grid circuit of amplifier 302 as shown in Fig. 3.

The cathode 407 of rectifier 402 is coupled to the grid 449 of an amplifier 448 through a capacitor 444. A grid leak resistor 445 is connected between grid 449 and ground. A cathode bias resistor 446 is connected between cathode 450 of amplifier 448 and ground. The remaining connections to amplifier 448 are not shown but would be familiar to one skilled in the art to which this invention pertains. In the negative position of switch 436 anode potential is applied to amplifier 448 through a resistor 443 from a source of D. C. potential applied at terminal 426. The resistor 443 is connected to switch contact terminal 441. Switch contact terminal 442 is connected to the anode of amplifier 301 as may be seen in Fig. 3. In the positive position of switch 436 amplifier 448 receives its anode potential through the circuits of amplifier 301.

Figure 5:
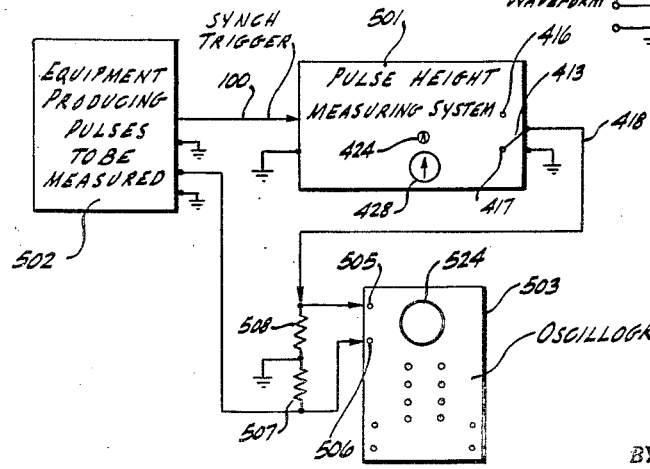
Fig. 5 is a block diagram to show the interconnection of the system of this invention with the equipment producing the pulse to be measured and with an oscillograph.

Referring now to Fig. 5, there is shown the interconnection between the pulse height measuring system 501 of this invention and the source of pulses to be measured 502 along with an oscillograph 503 where the pulses are observed.

The pulse height measuring system 501 as shown in block form in Fig. 1 is connected by its input terminals 100 to an equipment 502 producing pulses to be measured.

Pulse height measuring system 501 has an output circuit, part of which is shown within block 501 in Fig. 5. The parts bear reference characters corresponding to the identical parts shown in Fig. 4. The output connection 418 of the pulse height measuring system 501 may be connected to one vertical deflection terminal 505 of an oscilloscope 503. Another connection is made between the equipment 502 and the other vertical deflection terminal 506 of the oscillograph 503.

A terminating resistor 508 is connected from terminal 505 to ground and an identical resistor 507 is connected from terminal 506 to ground. A voltmeter 428 and a voltage control 424 are provided on pulse height measuring system 501. These have previously been noted and described in Fig. 4.

An alternative connection such as described above is shown in Fig. 6. The output connection 418 is connected to a resistor 601. The pulse of unknown height is applied from terminal 510 of equipment 502 to a resistor 602. Resistors 601 and 602 have a common connection to a resistor 603. Resistor 603 is connected to vertical input terminal 505 of oscillograph 503. The other vertical input terminal 506 is grounded.

It may now be seen by referring to the several figures that when a pulse to be measured is generated in an equipment 502, a corresponding synchronizing pulse may be applied to terminal 100 of the pulse height measuring system of this invention, generally indicated by block diagram Fig. 1. The pulse applied to the input terminals 100 in the system activates a keyer tube 203 which triggers a one-shot multivibrator 102 of Fig. 1 and tubes 204 and 205 of Fig. 2. The multivibrator generates a rectangular pulse 209 of short duration which after the action of diode 213 to remove any overshoot is a very rectangular pulse 217. Pulse 217 is applied to a cascaded two stage video amplifier including tubes 301 and 302. The gain of amplifier 301 is in part controlled by variable resistor 325. The video amplifier including tubes 301 and 302 has a band width of some 15 megacycles to make possible a very true reproduction of the rectangular pulse as shown at 304 in Fig. 3. The pulse 304 is applied to video amplifier 303 which has a higher amplification and narrow band width, the band width being approximately 300 kc. This results in a pulse as shown at 314. The pulse 314 is applied to an inverter stage 315 which provides two pulse output signals. One is a negative going pulse 318 and is developed in the plate circuits of inverter 315. The other is a positive going pulse 316 and is developed in the cathode circuits of inverter 315. The negative going pulse 318 is applied to the cathode 405 of a biased diode 404. The positive going pulse 316 is applied to the anode 401 of biased diode 402. Bias voltage is applied to both diodes 402 and 404 in their cathode circuits from the regulated voltage across gaseous voltage regulator 419. Control 424 is arranged so that the bias applied to diodes 402 and 404 may be adjusted. Accordingly, the bias voltage appearing between the variable arm 427 of control 424 and ground is measured and indicated on voltmeter 428. The measurement is of the bias voltage applied to the diodes 402 and 404. This sets the level beyond which conduction will occur and below which there will be no conduction. Thus there will appear at capacitor 444 a positive going signal pulse and at terminal 437 a negative going signal pulse having an amplitude which is regulated by the bias applied to the diodes 402 and 404, respectively. As the bias voltage is adjusted to higher values a greater pulse amplitude is necessary to overcome the bias. The excess of this amplitude over the bias is applied to video amplifier 302 as a negative feed-back pulse to control the gain of the system so that the value of this amplitude of the pulse appearing at terminal 418 does not exceed the bias value. The fixed D. C. bias value is indicated in volts on voltmeter 428 and therefore corresponds to the amplitude in volts of the pulse signal appearing at terminal 418.

In order that the feedback circuit shall not have an excessive load put upon it the bias controls 424 (Fig. 4) and 325 (Fig. 3) are connected to a common shaft. This maintains the level of the pulse such as 304 which the negative feedback pulse 451 or 452 must control at a uniformly but only slightly higher level.

Pulses 316 and 318 of Fig. 3 are shown as they appear when unaffected by a feedback control pulse. Pulses 316a and 318a (Fig. 4) represent the controlled pulse amplitude.

At the same time as the pulses 316 and 318 are applied to diodes 402 and 404, respectively, they also appear at the terminals of switch 410. Pulse 316 appears at terminals 414 and 417. Pulse 318 appears at terminals 415 and 416. Accordingly, when switch 410 is in the negative position, that is, when switch arms 412 and 413 on a common shaft are contacting terminals 414 and 416 respectively, negative pulse 318a is directed to output terminal 418 while positive pulse 316a is dissipated in load resistor 411. Conversely, when switch 410 is in the positive position, positive pulse 316a is directed to output terminal 418 through contact terminal 417 and arm 413 while negative pulse 318a is dissipated in load resistor 411. Switch 410 is manually operable so as to select either negative or positive pulse output from the system at terminal 418.

The signal pulse, either 316a or 318a, appearing at terminal 418, is applied across resistor 508 to the vertical input circuit of an oscillograph 503.

The pulse signal from the source 502 of pulses to be measured is applied to the vertical input circuit of the oscillograph 503 across resistor 507. Thus, at the input circuit 505, 506 of the oscillograph 503, a pulse to be measured is applied at the same time as a locally generated pulse. As can be seen in Fig. 5, the pulse to be measured is applied to the oscillograph 503 with opposite polarity to the locally generated pulse. In this way when the amplitude of the locally generated pulse is equal to the amplitude of the pulse to be measured but opposite in direction, there will be no indication on the screen of oscillograph 503.

The amplitude of the locally generated pulse is controlled by the feedback circuit comprising diodes 402, 404 and bias voltage control 424. The operation of these elements in applying the appropriate pulse 451 or 452 as selected by switches 410 and 436 back to the input of video amplifier 302 has been previously described.

For illustrative purposes consider a pulse of positive amplitude applied across resistor 507 from the source of pulses to be measured 502, equal to fifteen volts. The amplitude of this pulse is actually unknown. This pulse to be measured is indicated by a particular amplitude on the oscillograph 503. Simultaneously the same unknown positive pulse or a corresponding synchronizing pulse is applied to the input 100 of the equipment of this invention to trigger the generation of pulses 316 and 318, as has been described above. Because the pulse from source 502 applied to the oscillograph 503 is positive going, the desired pulse for measurement comparison should be negative. Accordingly, switch 410 is set to negative position. Switch 436 is also set to negative position. The switches 410 and 436 may be included on a common shaft. Positive pulse 316a is thereby dissipated in load resistor 411 while negative pulse 318a is applied to the oscillograph across resistor 508. Negative pulse 318 and positive pulse 316 are applied to diodes 404 and 402 respectively. Since switch 436 in common with switch 410 is now in "negative" position, the negative pulse at the output of diode 404 on terminal 437 is applied through capacitor 439 to the grid of amplifier 302. Positive bias voltage from the arm 427 of control 424 is applied to the cathode 405 of diode 404 through resistor 498. When the pulse 318 exceeds this bias, diode 404 conducts to apply what is in effect a negative feedback voltage to the grid of amplifier 302. In the illustrative example of an unknown pulse of 15 volts, applied to the oscillograph, when the pulse 318 exceeds the 15 volt bias then the gain of amplifier 302 will be reduced by the application of negative pulse 451. Pulse 318a is maintained at 15 volts by the negative feedback action and is applied to the oscillograph. Accordingly, then, the two pulses 318a and the unknown pulse will be equal and opposite. The indicator of oscillograph 503 in this condition will indicate a straight line.

If the unknown pulse has a different amplitude from 15 volts there will be an appropriate difference pulse shown on the indicator screen. Bias adjustment 424 is then set to a new value at which pulse 318a and the unknown pulse cancel. The new value of the bias voltage to which control 424 is set is then read on meter 428.

This reading is therefore equal to the amplitude in volts of the unknown pulse.

What is claimed is:

1. A pulse height measurement system, comprising a pulse generator; an amplifier; an inverter; a biased rectifier feedback circuit, said rectifier circuit including a bias source, means for adjusting the bias voltage developed by said bias source, and a bias voltage indicator; display indicating means; a selective output circuit; and a source of pulses to be measured; said pulse generator coupled to said source of pulses and adapted to generate a local pulse in synchronism with each pulse from said source; said amplifier being coupled to said pulse generator; said inverter being coupled to said amplifier and adapted to produce simultaneous output pulses of opposite polarity in response to each of said local pulses; said selective output circuit being coupled to said inverter and to said display indicating means for applying a selected one of said output pulses to said display indicating means; said biased rectifier feedback circuit being coupled between said selective output circuit and said amplifier for applying a feedback signal to said amplifier when said output pulses exceed a predetermined amplitude, said predetermined amplitude being determined by the adjustment of said bias adjusting means, said predetermined amplitude corresponding to the bias voltage and corresponding to the value of said voltage indicated on said bias voltage indicator; and said source of pulses being coupled to said display indicator, whereby when said output pulse is equal in amplitude and opposite in polarity to the pulse from said source of pulses, said bias voltage represents the amplitude of said source pulses.

2. In a pulse height measuring system, means for generating a comparison pulse against which to measure a pulse under test, said comparison pulse generating means comprising: an input circuit; a keying circuit; a multivibrator; said input circuit coupled to a source of the pulses under test and adapted to receive synchronizing pulses from the source; said keying circuit being coupled to said input circuit and adapted for producing a keying pulse in response to each of said synchronizing pulses, said multivibrator being coupled to said keying circuit and adapted to produce one pulse in response to each keying pulse; a first, second, and third amplifier connected together in cascade relation and coupled to said multivibrator for amplifying and shaping pulses applied to said first amplifier; a phase inverter coupled to said third amplifier having a first and a second output circuit for simultaneously producing a positive pulse in said first output circuit and a negative pulse in said second output circuit; a first rectifier coupled to said first output circuit; a second rectifier connected to said second output circuit; an adjustable bias voltage source, said bias voltage source being connected to said rectifiers for limiting the responsiveness of said rectifiers to said positive and said negative pulses the amplitudes of which exceed said bias voltage applied to said rectifiers; an inverting amplifier coupled to said first rectifier, said inverting amplifier and said second rectifier being coupled to said first amplifier; an output terminal; and a selection switch coupled to said first and said second output circuits and to said rectifiers for applying a selected one of said positive and negative pulses to the selected one of said rectifiers and to said output terminal, whereby said pulses, the amplitudes of which are in excess of said bias voltage, are applied through the selected one of said rectifiers to said first amplifier as a negative feedback control to maintain the pulses applied to said output terminal at a constant amplitude equal to said bias voltage, said amplitude being the measure of said pulses under test when the pulses under test and the pulses applied to said output terminal are equal.

3. A pulse amplitude measuring system comprising a source of pulses to be measured; a pulse generating means coupled to said source and adapted to be responsive to each of the pulses to be measured for generating a pair of simultaneous pulses each of opposite polarity; an adjustable pulse amplitude control means having an indicator for indicating pulse amplitude, said control means being coupled to said generating means and adapted for selectively setting the amplitude of said simultaneous pulses to a predetermined level corresponding to the level of a selected pulse to be measured; selective output means having an output circuit coupled to said generating means and adapted for impressing a selected one of said simultaneous pulses on said output circuit; said selection being dependent upon the polarity of said selected pulse to be measured; and display means coupled to said selective output means and to said source of pulses to be measured, said display means being adapted for visual comparison of the amplitudes of said selected one of said simultaneous pulses and said pulses to be measured, whereby upon the adjustment of said amplitude control means to bring the selected pulse to equal amplitude with the pulse to be measured, the indicator of said adjustable control means shows the amplitude of the pulse to be measured.

4. A pulse amplitude measuring system comprising a source of pulses to be measured; a pulse generator coupled to said source and responsive thereto for generating a local pulse for each of the pulses to be measured; an amplifier coupled to said pulse generator; an inverter coupled to said amplifier, said inverter having an output circuit and a selective output means coupled between said inverter and its output circuit, said inverter being adapted to develop simultaneous output pulses each of opposite polarity with respect to the other in response to each of said local pulses; said selective output means being adapted to impress a selected one of said simultaneous output pulses on said output circuit; an adjustable biased rectifier circuit coupled between the output circuit of said inverter and said amplifier, said rectifier circuit being adjustable to conduct only when a predetermined amplitude of said selected one of said simultaneous output pulses has been exceeded to apply a feedback voltage to said amplifier to limit the selected output pulse in said output circuit to a value not in excess of said predetermined amplitude; and indicating means coupled to said source of pulses to be measured and to said output circuit, said indicating means being adapted for comparing the amplitudes of said pulses to be measured and said selected one of said simultaneous output pulses.

References Cited in the file of this patent

UNITED STATES PATENTS 2,143,219     Wenger _____ Jan. 10, 1939

FOREIGN PATENTS 646,647     Great Britain _____ Nov. 29, 1950